United States Patent [19]

Marpe

[11] 4,095,625

[45] Jun. 20, 1978

[54] DUST CONTROL SYSTEM FOR GRAIN LOADING

[75] Inventor: Donald E. Marpe, Bloomington, Minn.

[73] Assignee: Peavey Company, Minneapolis, Minn.

[21] Appl. No.: 760,684

[22] Filed: Jan. 19, 1977

Related U.S. Application Data

[63] Continuation-in-part of Ser. No. 595,783, Jul. 14, 1975, abandoned.

[51] Int. Cl.² ............................................. B65B 1/06
[52] U.S. Cl. ................................... 141/93; 209/149; 55/1; 55/385 R; 55/465; 222/152; 141/286; 141/392; 193/4
[58] Field of Search ................. 55/1, 342, 461, 385 R, 55/465; 193/2 R, 3-5, 17-19, 22; 141/93, 126, 290, 392, 286; 302/59, 61, 62; 222/53, 152; 209/133, 136, 137, 143, 146, 138, 139 R, 149

[56] References Cited

U.S. PATENT DOCUMENTS

| 644,855 | 3/1900 | Forster | 141/93 |
| 1,798,711 | 3/1931 | States | 193/4 |
| 1,881,507 | 10/1932 | Gredell | 302/59 |
| 2,744,792 | 5/1956 | Finn | 302/59 |
| 3,241,581 | 3/1966 | Richardson et al. | 141/93 |
| 3,422,972 | 1/1969 | Shankland | 193/3 X |
| 3,438,681 | 4/1969 | Lunde | 302/59 |
| 3,707,998 | 1/1973 | Dalrymple | 141/93 |
| 3,710,561 | 1/1973 | Garrone | 55/461 |
| 3,739,893 | 6/1973 | Kaufmann | 141/93 |
| 3,749,533 | 7/1973 | Lombardi | 141/93 |
| 3,799,221 | 3/1974 | Vincent | 141/93 |
| 3,868,238 | 2/1975 | Mills et al. | 141/93 |
| 3,902,762 | 9/1975 | Frushour et al. | 302/59 |

FOREIGN PATENT DOCUMENTS

| 492,069 | 4/1953 | Canada | 302/61 |

*Primary Examiner*—Frank W. Lutter
*Assistant Examiner*—David L. Lacey
*Attorney, Agent, or Firm*—Orrin M. Haugen; Thomas J. Nikolai

[57] ABSTRACT

A system for confinement and removal of air-borne dust emitted during discharge delivery of particulate solids from an elevated supply source and through an enclosed descending column. The enclosed column has a delivery spout at the discharge end, the spout including a generally enclosed shroud with an open bottom wall defining the discharge opening. An arcuate lead-in flow diverter plate is coupled to the underside of the descending enclosed column and curves generally inwardly of the column. An abutment plate is disposed forwardly of the flow diverter plate at the opposed end of the discharge opening and is positioned along the normal flow path of particulate solids passing from the lead-in flow diverter plate so as to define a dynamic seal with the particulate solids moving across the discharge opening. A dust collecting duct is coupled through the spout shroud above the discharge opening so as to receive and remove a flow of dust laden air from the discharge spout to a solid-air separator means. The structural arrangement generates a flow pattern for the grain with reduced vertical velocity at the output, the reduction being accomplished, at least in part, through interaction among the grain kernels.

5 Claims, 3 Drawing Figures

DUST CONTROL SYSTEM FOR GRAIN LOADING

CROSS-REFERENCE TO RELATED APPLICATION

The present application is a Continuation-in-Part of my co-pending application Ser. No. 595,783, filed July 14, 1975 and entitled "DUST CONTROL SYSTEM FOR GRAIN LOADING" now abandoned.

BACKGROUND OF THE INVENTION

In the transfer of large quantities of particulate solids, such as grain and the like, such as the transfer from one storage location to a transporting vehicle or vessel, a flow of grain is normally controlled through enclosed columns or conduits, with the conduits having a discharge chute or opening at the lower end thereof. The movement or flow of the grain is analogous to fluid flow, and entrained air frequently causes a cloud of dust to be generated at the discharge end of the column or conduit.

Two basic techniques may be utilized to reduce the quantity of air-borne dust emitted during the discharge delivery, one being to reduce or prevent the generation, the second being to collect, capture, or otherwise control the environment in which the dust generation occurs. The present system utilizes a combination of these two basic techniques, including the utilization of a shroud means for collection of dust, along with the generation of a flow pattern which reduces the severity of interaction of the grain kernels outside of the controlled or confined shroud area. When the dust is collected, separation of the solid particles from the supporting air is conducted in a solid-air separator or the like such as a filter chamber or the like.

In the handling of grain, a typical operation includes the transfer of the grain from an elevator structure to the hold of a transporting vehicle, such as for example, a ship, barge, or the like.

The structural features of the various vessels into which grain is loaded and transported vary considerably. For example, in the typical grain transporting barges, three basic and different designs are utilized, including, for example, the typical open-top barge, a hatched barge having oval-shaped openings for access to the hold, and a barge having a hatch with rectangular metal openings formed in the hatch. In open-top barges, the cargo is shielded or protected with sliding panels, and these structures constitute approximately 50% of the grain transport barges in use at this time. This design provides the greatest degree of flexibility in loading, inasmuch as the cargo area is easily reached with a typical discharge spout, and the grain may be loaded into the barge relatively easily.

In handling of grain, flow characteristics and patterns must be considered in order to reduce the risk of damage to the product. In particular, the fracturing of individual grain kernels must be held to a minimum.

It will be appreciated that the location of the grain supply is fixed, and the location of the receiving vessel is variable. Therefore, the angle at which the discharge chute is maintained during loading may vary from about 45° to about 70° from the horizontal, thereby providing a significant variation in discharge velocity of the grain being moved through the discharge chute.

The generation of dust in a grain loading operation is substantial. Dust is raised or otherwise emitted whenever the velocity of the ambient air is sufficient to support the particulate matter. This air velocity is a function of a number of variables including, for example, wind, secondary air currents caused by momentum transfer from the grain, or mechanically produced air flow. The first two variables contribute to the generation and emission of dust during a grain operation, while the third is usually associated with the collection of dust. The present arrangement provides a structural arrangement including a shroud which controls the flow of the secondary air currents generated by momentum transfer, and utilizes these secondary air currents for a useful purpose and function in the removal of air-borne dust.

In the past, attempts have been made to control dust emission by utilizing a reverse air flow through a portion of the delivery conduit or column, or by immersing or otherwise burying the delivery spout into the grain accumulated at the end of the chute. Still another technique involves controlling dust by covering the open area of the receiving vessel with a tarpaulin or the like, and controllably exhausting the air outwardly through a remote collection system. Still another technique involved the placing of a hood or the like over the discharge end of the chute and exhausting air through this hood. Each of these techniques involved difficulties, such as causing a clogging of the spout or conduit, a failure to significantly reduce the emission of dust, or imposes limitations on the type of vessels or receivers used.

In accordance with the present invention, a system is provided for controlling the emission of air-borne dust, with the system being adapted for use in any of the conventional transporting vessels. Briefly, the discharge end of the conduit or column is provided with an enclosing shroud with an open bottom wall which defines the ultimate discharge opening. An angularly disposed lead-in flow diverter plate is provided so as to at least partially change the direction of flow of the grain to a more horizontally disposed path with a consequent virtual momentary elimination of any vertical downward velocity component. The edge of the lead-in flow diverter plate forms one edge surface of the discharge opening. At the opposed edge surface of the discharge opening, an abutment plate is interposed so as to intersect the normal flow path of the grain as it passes from the edge surface of the flow diverter plate. The grain, when passing across the span between the edge of the flow diverter plate and the abutment plate forms a "dynamic seal" between the ambient and the upper enclosed volume of the spout enclosing shroud, thus confining a substantial portion of the dust generated within the enclosed shroud. A duct is coupled to the upper portion of the spout enclosing shroud, with this duct, being in turn coupled at its other end to a solid-air separator means. Air flow between the enclosed shroud and the solid-air separator means is achieved to a substantial extent by virtue of the mechanically produced air flow resulting from the grain passing through the enclosed column.

In addition to its effective dust control, this system is versatile in that it finds utility in connection with the barge top variations in present use, and also causes little, if any, damage to the grain passing through. The system is energy efficient in that it utilizes the energy developed from the descending grain for achieving a flow of air useful in carrying the collected or captured dust to a solid-air separator.

SUMMARY OF THE INVENTION

Therefore, it is a primary object of the present invention to provide an improved apparatus and system for confinement and removal of air-borne dust emitted during discharge delivery of particulate solids from an elevated supply source and to a remote vessel.

It is yet a further object of the present invention to provide an improved apparatus and system for removal of air-borne dust emitted during discharge delivery of particulate solids from an elevated supply source, and wherein the solids are passed through a descending chute means and outwardly through a delivery spout at the discharge end, the delivery spout being equipped with an enclosed shroud having means for establishing an air flow from the shroud through a duct means and to a solid-air separator means.

It is yet a further object of the present invention to provide an improved apparatus and system for the removal of air-borne dust emitted during discharge delivery of grain from the top of a grain elevator and into a transporting vessel such as a barge or the like, the apparatus being adapted for utilization in connection with those various barge top structures in present use.

Other and further objects of the present invention will become apparent to those skilled in the art upon a study of the following specification, appended claims, and accompanying drawing.

DESCRIPTION OF THE PREFERRED EMBODIMENT

Figure 1:
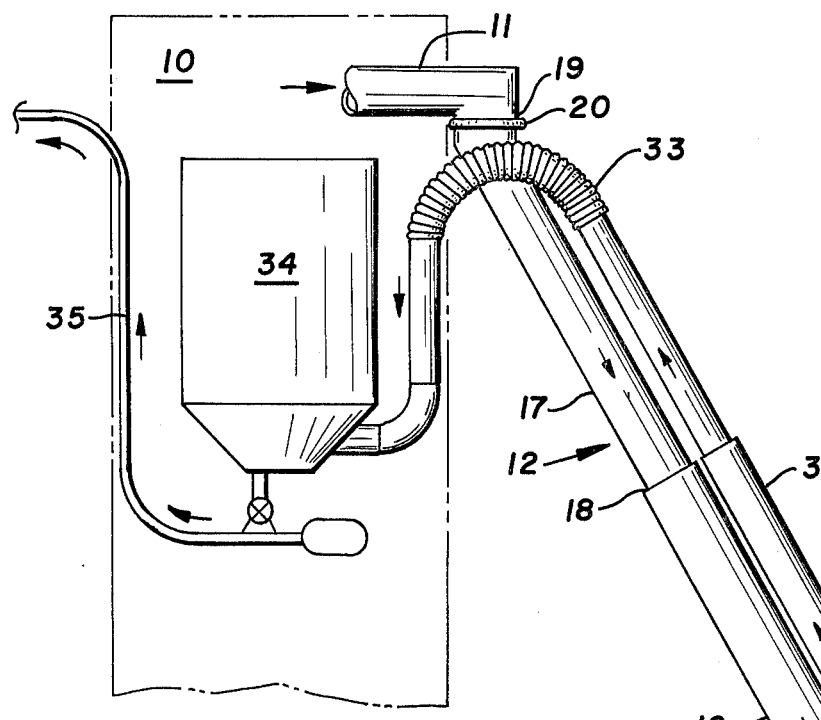
FIG. 1 is a schematic illustration of a grain storage and transfer apparatus in accordance with the present invention, and illustrating a descending chute extending from the top of a grain elevator to the hold of a transporting vessel, the system also illustrating a spout enclosing shroud with a duct extending from the shroud to a remotely disposed filter unit.

In accordance with the preferred embodiment of the present invention, and with particular reference directed to FIG. 1 of the drawing, the grain storage structure such as the elevator generally designated 10 is provided with the conventional means (not shown) for elevating the storage grain to the top thereof, the grain being delivered to the upper portion 11 of the chute generally designated 12 for delivery to the hold 13 of the transport vessel 14, the vessel in this case being illustrated as a barge. The chute 12 is, as is conventional, formed of a plurality of telescoping segments 16 and 17, secured together by a conventional telescoping joint such as at 18. The upper receiving end 19 of the chute 12 is preferably provided with a swivel joint, as indicated at 20, in order to provide for proper articulation of the chute. A delivery spout generally designated 22 is provided at the discharge end of chute 12, and is arranged, as indicated, to provide a controlled flow of grain into the hold 13, the grain flow being illustrated at 24.

Figures 2, 3:
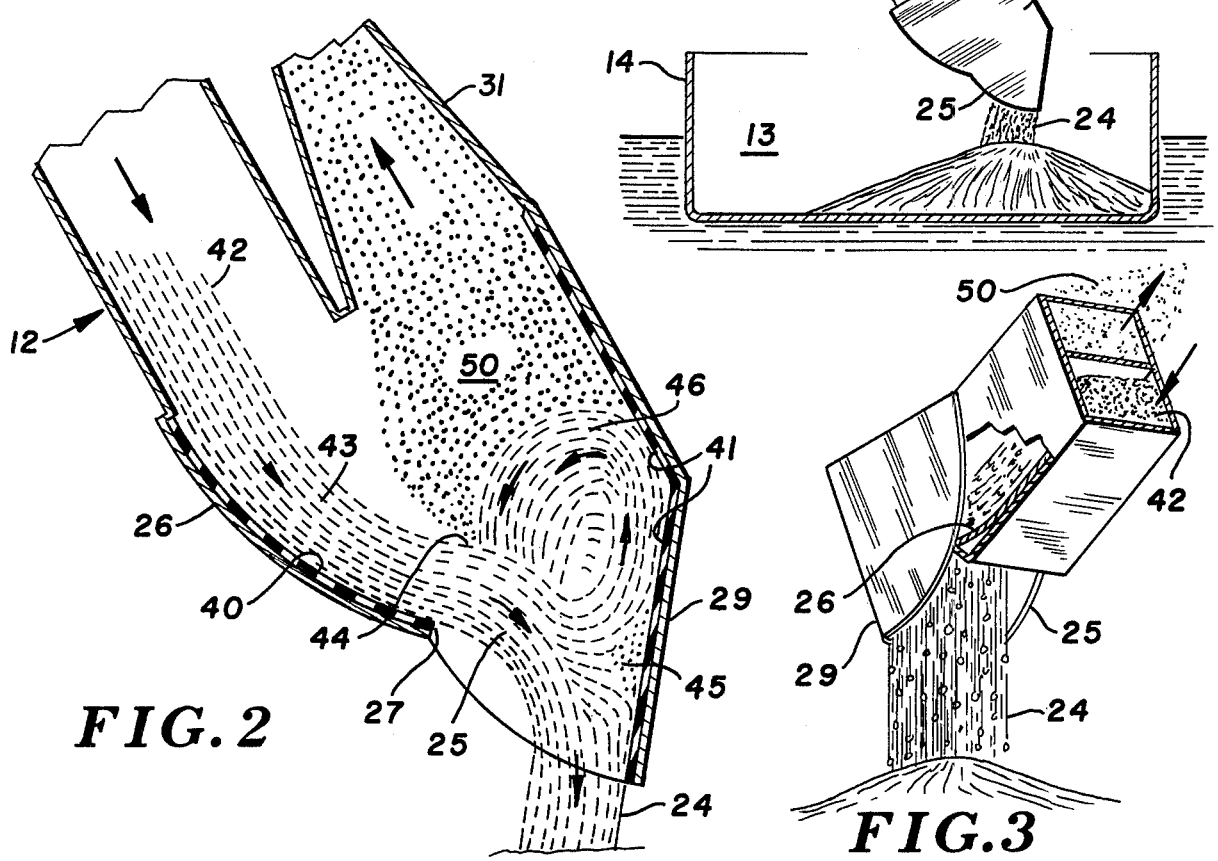
FIG. 2 is a partial detail view on a slightly enlarged scale of the delivery spout and the enclosing shroud arrangement attached thereto, and illustrating the typical flow of grain from the chute to the discharge opening and outwardly therefrom.
FIG. 3 is a detail perspective view, on a slightly enlarged scale, of a slightly modified delivery spout portion of the apparatus of the present invention.

The delivery spout 22 includes a generally enclosed shroud member as at 23, and with an open bottom wall defining a discharge opening as at 25 (see FIG. 2) for accommodating the grain flow as indicated at 24. An arcuate lead-in flow diverter plate is provided at 26 (see FIG. 2) with this lead-in flow diverter plate extending generally in continuation with the underside wall of the enclosed column of the descending chute means. The forward surface of the arcuate lead-in flow diverter plate forms one edge of the discharge opening 25, as is apparent in the illustration of FIG. 2. Further, as is illustrated in FIG. 2, the forward surface 27 of the arcuate lead-in flow diverter plate is disposed along a plane which is substantially normal to and intersecting a projected extension of the central axis of the chute. This provides an adequate lead-in length to properly divert the flow without inducing damage to the grain kernels, and also sufficiently to provide a flow diversion consistent with that necessary to achieve the generation of a dynamic seal.

On the opposed side of the lead-in flow diverter plate 26 is an abutment plate 29, the abutment plate 29 being positioned along and intersecting the normal flow path of grain passing from the lead-in flow diverter plate 26. Also, as is noted, the plane of abutment plate 29 is generally normal to the axis of the flow path of the grain as it leaves lead-in flow diverter plate 26.

With continued attention being directed to FIG. 1, and with additional attention being directed to FIG. 2, at the top of shroud 23, a duct means indicated generally be numeral 30 is coupled, to the shroud 23 so as to be in communication with the interior confines or volume of shroud 23. Duct means 30 extends from the flared boot portion 31 through the main duct portion 32, and to a flexible coupling portion as at 33, and ultimately to filter unit generally designated 34. The filter 34 is a conventional solid-air separator structure and is provided with a discharge conduit 35 for transfer of collected dust to a suitable storage facility. It will be appreciated, of course, that filter unit 34 may be provided in any of a number of conventional forms, such as in a bag house, cyclone separator or the like.

In certain installations, it may be desirable to employ a vacuum system for assisting the flow of dust laden air from shroud 23 to the filter unit such as the filter 34. The requirement for supplemental vacuum or suction will, of course, depend upon the application, it being sufficient to state that in an air-tight system, the dust in the dust laden air will rise to approximately two-thirds of the height of the main transfer chute.

By way of relative sizes, the area of duct 32 should be approximately 50% of the area of chute 12, with this relationship being sufficient to accommodate an elevation of dust in the air column to at least approximately two-thirds of the height of the main descending chute.

In order to reduce the impact forces on the individual grain kernels, a rubber lining is provided on lead-in diverter plate 26, as at 40, with abutment plate 29 being provided with a rubber lining as at 41. This arrangement provides for a reduction in impact forces on the individual kernels passing downwardly through chute 12.

In a typical operation, and with attention being directed to FIGS. 1 and 2, grain from the elevator 10 is delivered through chute 12 in a flow pattern as illustrated at 42. This flow pattern or path is angularly directed by lead-in flow diverter plate 26 as at 43, so as to achieve a more horizontal component as the flow leaves the edge 27 of lead-in plate 26. Discharge opening 25 is "dynamically sealed" by the grain flow such as is seen at 44, with this seal effectively isolating the confines of shroud 23 from ambient. As the grain continues to flow across opening 25, the rate of flow is reduced by virtue of the intersecting abutment plate 29, and a convex loop is formed as at 46, with the discharge occurring as indicated at 24. It will be observed that a generally wedge-shaped dead spot 45 in the flow pattern occurs along the surface of the abutment plate 29, with this dead spot contributing significantly to the dissipation of energy of the flowing grain. In this connection, therefore, the downward vertical velocity becomes essentially zero, with the ultimate discharge flow, as at 24, being slow and gentle.

In the descending column, it will be appreciated that the vertical velocity increases due to the acceleration force of gravity. The vertical velocity achieves a maximum at the point in the column where lead-in plate 26 joins the column. From this point downwardly, a deceleration occurs due to the interaction of the flowing grain pursuant to the flow pattern. This deceleration affect is in contrast to a straight-through flow pattern which is frequently employed.

In this structure, therefore, it is possible to maintain the discharge opening at a point well above the upper surface of the accumulated grain, thereby providing a non-impeding arrangement for the grain flow at discharge.

In the system, the mechanically produced air flow creates a zone of trapped dust as at 50, with this zone being maintained at a superpressure because of the mechanically produced flow generated by the descending grain column. It is, of course, acknowledged that dust is raised whenever a change in momentum occurs with the host or substrate. Since dust is only weakly attached to grain particles, a substantial quantity of dust will be raised in the zone 50. Momentum changes occur due to interaction between grain kernels, as well as that which occurs when an obstruction is encountered such as abutment plate 29. Accordingly, it will be appreciated that the trapped dust in zone 50 is maintained constant during flow of grain, and furthermore that this trapped dust zone is effectively isolated from ambient by virtue of the dynamic sealing developed by the grain flow as at 44.

It will be appreciated that the system and apparatus of the present invention is adapted for use in connection with particulate solids other than grain. Dust emission is a frequent problem in transfer or handling of many particulate solids, and including, for example, coal, cement, aggregates, and the like.

I claim:

1. Apparatus for removal of air-borne dust emitted discharge delivery of particulate solids from an elevated supply source and through conduit means, said apparatus comprising:
   (a) descending chute means comprising an enclosed column extending between a collecting port at the upper receiving end and a gravity fed delivery spout at the discharge end, said upper receiving end being adapted to be coupled to an elevated supply source;
   (b) said delivery spout comprising a generally enclosed shroud with an open bottom wall defining a discharge opening and including an arcuately disposed lead-in flow diverter plate extending generally in continuation with an exterior wall portion of said enclosed column, and extending arcuately inwardly of said enclosed column and terminating along a substantially horizontally disposed forward surface with the said forward surface extending across the width of said chute means and defining one edge of said discharge opening;
   (c) a generally vertically disposed abutment plate means disposed generally forwardly of said flow diverter plate and arranged in spaced relationship from said diverter plate forward surface and defining the opposed edge wall of said discharge opening, said abutment plate means being positioned along and intersecting the normal flow path of particulate solids passing from said lead-in flow diverter plate and with said abutment plate means being mounted in a plane generally normal to the flow path of said particulate solids upon passing said diverter plate; and
   (d) dust collecting duct means separated from said descending chute means and having one end coupled to said spout shroud above said discharge opening and with the opposed end of said duct collecting dust means being coupled to a solid-air separator means.

2. The apparatus as defined in claim 1 wherein the forward surface of said arcuately disposed lead-in flow diverter plate terminates generally along an edge surface extending across the width of said shroud with said edge surface being normal to and intersecting a projected extension of the central axis of said descending chute means.

3. The apparatus as defined in claim 2 wherein said abutment plate means is provided with a resilient yielding material on the surface thereof facing said flow path.

4. A method of controlling air-borne dust emitted during discharge delivery of particulate solids from an elevated supply source, said method comprising:
   (a) passing a flow of particulate solids generally downwardly by gravity through an enclosed descending chute and into a shroud enclosure adjacent the discharge opening of said chute;
   (b) diverting said flow of particulate solids arcuately toward the horizontal as said flow approaches said discharge opening of said chute so as to establish a substantially horizontal flow generally transverse across substantially the entire area of said discharge opening to create a zone of superpressure within said enclosure sealed from ambience; and
   (c) venting said zone of superpressure to a solid-air separator for removal of solids.

5. Apparatus for removal of air-borne dust emitted during gravitational discharge delivery of particulate solids from an elevated supply source and through conduit means, said apparatus comprising:
   (a) descending chute means comprising an enclosed column extending between a collecting port at the upper receiving end and a gravity fed delivery spout at the discharge end, said upper receiving end being adapted to be coupled to an elevated supply source;
   (b) said delivery spout comprising a generally enclosed shroud with an open bottom wall defining a discharge opening and including an arcuately extending lead-in flow diverter plate extending generally in continuation with one wall of said enclosed column, and extending arcuately inwardly of said enclosed column and terminating along a substantially horizontally disposed forward surface with the said forward surface extending across the width of said shroud and defining one edge of said discharge opening;

(c) a generally vertically disposed abutment plate means disposed generally forwardly of said flow diverter plate and arranged in spaced relationship from said diverter plate forward surface and defining the opposed edge of said discharge opening, said abutment plate means being positioned along and intersecting the normal flow path of particulate solids passing from said lead-in flow diverter plate and with said abutment plate means being mounted in a plane generally normal to the flow path of said particulate solids upon leaving said diverter plate and passing across said discharge opening; and dust collecting means separated from said chute means and comprising an enclosed dust collecting duct having one end thereof disposed adjacent an opening formed in said enclosed shroud, and with the opposed end of said dust collecting duct coupled to a solid-air separator means.

* * * * *